F. M. MOSIER.
DOOR STOP.
APPLICATION FILED APR. 1, 1909.

935,392.

Patented Sept. 28, 1909.

Witnesses
Benj. Finckel
Ada Gamb

Inventor
Frank M. Mosier
by  
his Attorneys

UNITED STATES PATENT OFFICE.

FRANK M. MOSIER, OF COLUMBUS, OHIO.

DOOR-STOP.

935,392.

Specification of Letters Patent.   Patented Sept. 28, 1909.

Application filed April 1, 1909.   Serial No. 487,226.

*To all whom it may concern:*

Be it known that I, FRANK M. MOSIER, a citizen of the United States, residing at Columbus, in the county of Franklin and State of Ohio, have invented a certain new and useful Improvement in Door-Stops, of which the following is a specification.

The object of this invention is to provide an improved door stop especially adapted for the doors of vehicles as, for example, automobiles and the like. So far as I am informed such stops have usually been of leather or some other flexible material which, among other objectionable incidents, project unduly into the vehicle, are unsightly and soon wear out.

The present invention consists in the improved simplified construction hereinafter described and claimed, the invention not being confined to the particular instance of it illustrated in the accompanying drawing.

Figure 1:
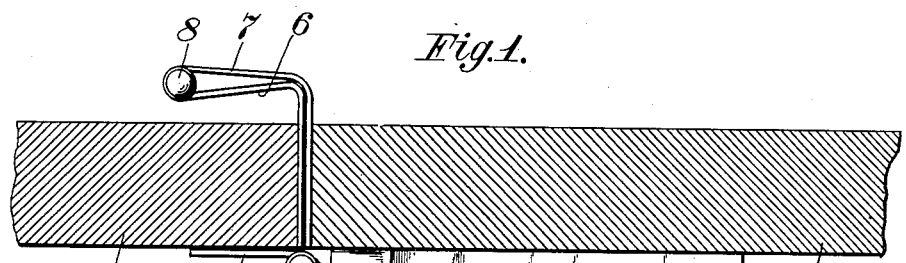
Figure 2:
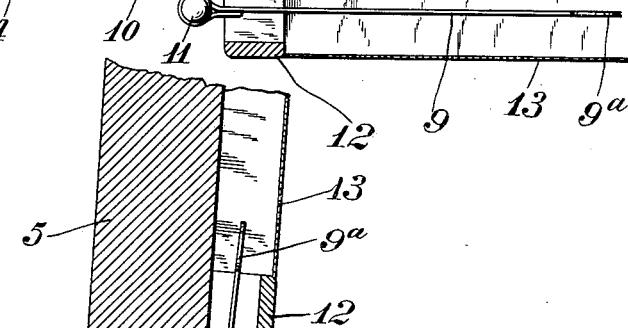
Figure 3:
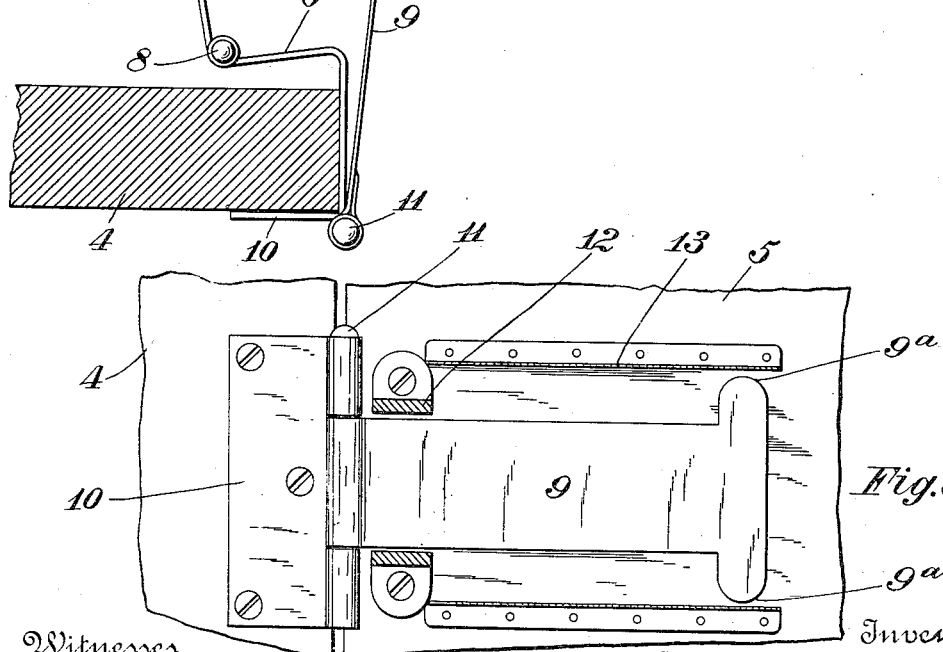

In said drawing—Figure 1 is a horizontal sectional view with the door closed. Fig. 2 is a similar view with the door open. Fig. 3 is a view looking at the inner side with the stop and housing for the stop slide in section.

In the views 4 designates the body of the vehicle and 5 the door fractions only of which are shown. The door shown is that of an automobile and the lower hinge thereof comprises leaves 6 and 7 bent so that when the hinge is attached to the door and body its pintle at 8 is set back from the edge of the door pillar and so that when the door is opened it stands at approximately right angles to the side of the body with the edge of the pillar and the frame of the door lying in substantially the same plane. The pintle 8 of this hinge is for convenience in assembling made removable.

9 designates the stop slide. This slide is preferably of rather stiff tempered spring brass or other suitable metal and it is hinged to the body at the inner corner of the door pillar by means of a leaf 10 and a removable pintle 11 so as to be free to be moved by the door as hereinafter described. The stop slide is provided at its outer or free end with laterally extending lugs $9^a$, $9^a$, and on the inner side of the door frame near its hinged edge is secured a metallic loop 12 against which the lugs $9^a$ abut when the door is opened to the limit of its intended opening movement, said loop serving to establish such limit. As the inner sides of vehicle doors are oftentimes upholstered, I provide a shield 13 constructed to be secured to the door frame over the stop slide and its path of movement so that the upholstery secured to the door shell shall not interfere with the proper operation of the device. This device therefore provides a simple, effective, durable and sightly stop concealed from view and offering no obstruction to persons occupying the vehicle.

What I claim is—

In combination with a structure provided with an opening and a door hinged thereto to close said opening, a stiff member hinged to said structure, and having a stop thereon, a member fixed on the door with reference to which said stiff member slides and against which its stop abuts when the door is at the limit of its open position, and a shield on the door to entirely inclose said stiff member and within which the stiff member wholly works, substantially as described.

FRANK M. MOSIER.

Witnesses:
ADA G. GAMBS,
BENJ. FINCKEL.